United States Patent
Zuo (10) Patent No.: US 9,201,660 B2
(45) Date of Patent: Dec. 1, 2015

(54) METHOD AND MOBILE TERMINAL FOR CONTROLLING DISPLAY OF WAITING INFORMATION DURING PROGRAM STARTUP

(75) Inventor: Jian Zuo, Shandong (CN)

(73) Assignee: Hisense Mobile Communications Technology Co., Ltd. (CN)

( * ) Notice: Subject to any disclaimer, the term of this patent is extended or adjusted under 35 U.S.C. 154(b) by 227 days.

(21) Appl. No.: 13/517,315

(22) PCT Filed: Jan. 24, 2011

(86) PCT No.: PCT/CN2011/070526
§ 371 (c)(1),
(2), (4) Date: Jun. 20, 2012

(87) PCT Pub. No.: WO2011/095085
PCT Pub. Date: Aug. 11, 2011

(65) Prior Publication Data
US 2012/0256935 A1 Oct. 11, 2012

(30) Foreign Application Priority Data
Feb. 3, 2010 (CN) .......................... 2010 1 0111302

(51) Int. Cl.
*G06F 9/44* (2006.01)
*G09G 5/395* (2006.01)
*G09G 5/399* (2006.01)

(52) U.S. Cl.
CPC .............. *G06F 9/4401* (2013.01); *G09G 5/395* (2013.01); *G09G 5/399* (2013.01); *G09G 2330/026* (2013.01)

(58) Field of Classification Search
None
See application file for complete search history.

(56) References Cited

U.S. PATENT DOCUMENTS 5,793,308 A * 8/1998 Rosinski et al. .............. 340/903
5,995,666 A * 11/1999 Nishio et al. .................. 382/232
(Continued)

FOREIGN PATENT DOCUMENTS

CN 101776986 A 7/2010

OTHER PUBLICATIONS

Schwebel, Flicker free booting, Jul. 31, 2009, http://marc.info/?l=linux-embedded&m=124905566901223.*
(Continued)

*Primary Examiner* — Carlos Perromat
*Assistant Examiner* — Xin Sheng
(74) *Attorney, Agent, or Firm* — DLA Piper LLP (US)

(57) ABSTRACT

A method and a mobile terminal for controlling display of waiting information during program startup are disclosed, relating to the field of computers. In the invention, a step of initializing a liquid crystal display (LCD) by a kernel is eliminated, and an LCD controller is reinitialized after the waiting information data in a bootloader display memory is copied to the display memory of the kernel, therefore, the LCD can directly read the waiting information data in the display memory of the kernel according to a display memory first address in the LCD controller. The waiting information data in the bootloader display memory is copied to the display memory of the kernel in advance, therefore, the displayed content is not changed completely for users. In addition, the step of initializing the LCD is eliminated, so that the phenomena of distortion, flashing, blurred screen and the like of the LCD screen display are completely avoided, the display quality during program startup is improved, and better visual experience is brought for users.

17 Claims, 4 Drawing Sheets

(56) References Cited

U.S. PATENT DOCUMENTS

| | | | |
|---|---|---|---|
| 6,148,387 A * | 11/2000 | Galasso et al. | 711/203 |
| 6,263,396 B1 * | 7/2001 | Cottle et al. | 710/263 |
| 6,272,627 B1 * | 8/2001 | Mann | 713/2 |
| 2005/0033979 A1 * | 2/2005 | Hyser | 713/200 |
| 2006/0107031 A1 * | 5/2006 | Kouno et al. | 713/2 |
| 2008/0192035 A1 | 8/2008 | Guan et al. | |
| 2008/0244250 A1 * | 10/2008 | Swanson et al. | 713/1 |
| 2010/0141685 A1 * | 6/2010 | Lee | 345/667 |

OTHER PUBLICATIONS

Hramrach, unable to control resolution of linux host with guest additions, 2009, http://www.virtualbox.org/ticket/1302.*

* cited by examiner

METHOD AND MOBILE TERMINAL FOR CONTROLLING DISPLAY OF WAITING INFORMATION DURING PROGRAM STARTUP

The present application is a U.S. National Stage of International Application No. PCT/CN2011/070526, filed 24 Jan. 2011, designating the United States, and claiming priority to Chinese Patent Application No. 201010111302.8, filed with the State Intellectual Property Office of China on Feb. 3, 2010 and entitled "METHOD AND MOBILE TERMINAL FOR CONTROLLING DISPLAY OF WANTING INFORMATION DURING PROGRAM STARTUP", which is hereby incorporated by reference in its entirety.

FIELD OF THE INVENTION

The present invention relates to a computer technology, in particular to a method and a mobile terminal for controlling display during program startup.

BACKGROUND OF THE INVENTION

In modern computer system, the startup of the system software is generally step by step, particularly in a linux embedded system. As the kernel occupies much space, it's difficult for the system software to be completely started at one time, thus a step-by-step startup method is adopted: first starting a simple small program (bootloader), also named as a pre-startup program, and then starting part of the hardware by the bootloader, so that larger kernel programs can be started.

In existing devices such as the mobile terminal and the like, the higher the integration level of hardware is, the more the components to be started are; and the stronger the functions realized by the software are, the more the codes of the software are. Due to the above reasons, the startup is slower. To bring better experience to users and prevent them from worrying about the long startup process, generally, a prompt that the system is being started is supplied to the users in the first step of the startup process. Generally, the best method to give the prompt is to display pictures on an LCD screen.

However, in the startup process, the software started step by step is relatively independent. When the software of a higher level is started, due to different requirements for the performance of the hardware, a LCD (Liquid Crystal Display) of an RGB interface may need to be reinitialized according to the requirements, and display of the LCD needs to read data from a video memory for storing the contents to be displayed, and then the contents are displayed according to the read data. The LCD of the RGB interface has no video memory for storing the displayed contents, and the video memory is realized by a CPU from a special area developed on a common memory; and when the LCD of the RGB interface needs to display contents, the CPU generally develops a special Direct Memory Access (DMA) channel, so that the LCD can directly read the data in the video memory through the Central Processing Unit (CPU). The development of the video memory and establishment of the DMA channel are implemented by corresponding software; and when the program of a higher level is started, the program must newly develop a video memory as required and establish a DMA channel when the LCD needs to read data.

Due to the step-by-step and hierarchical startup mode, when a new program is started, a new video memory is developed and a DMA channel is established, an LCD controller for controlling the display of the LCD is generally set as required, the first address of the video memory is stored in the LCD controller, and the LCD reads the contents in the video memory according to the first address of the video memory in the LCD controller.

Figure 1:
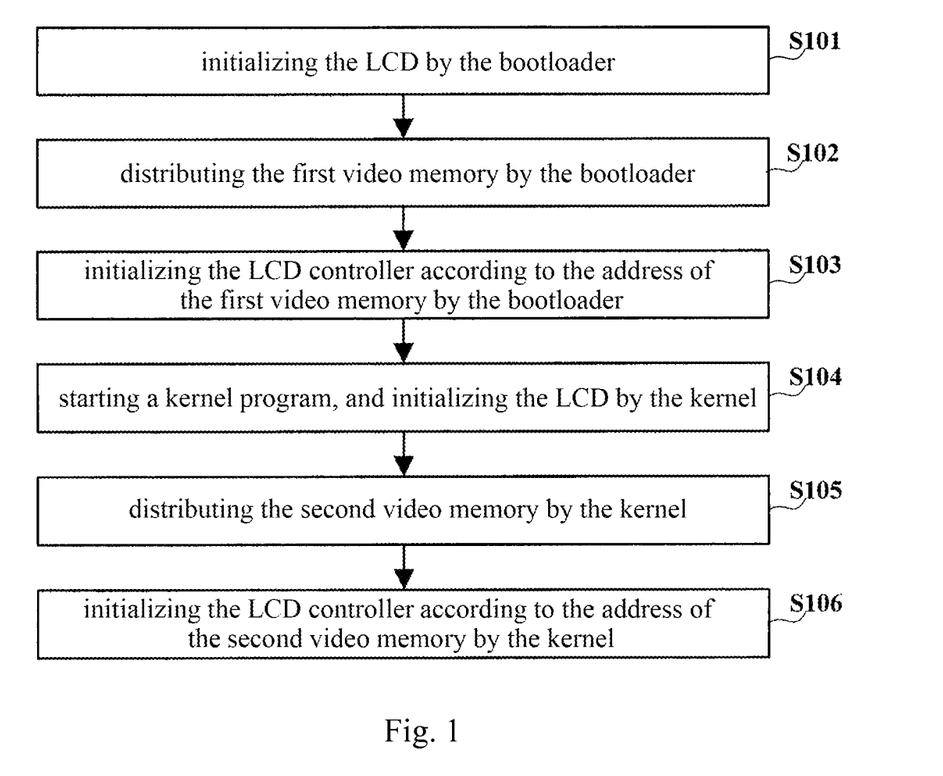
FIG. 1 is a flow chart of a program startup method in the prior art.

As shown in FIG. 1, during program startup, the method mainly includes the following steps:

S101, initializing the LCD by the bootloader;
S102, distributing a first video memory by the bootloader;
S103, initializing the LCD controller according to an address of the first video memory by the bootloader;
S104, starting a kernel program, and initializing the LCD by the kernel;
S105, distributing a second video memory by the kernel;
S106, initializing the LCD controller according to an address of the second video memory by the kernel.

When the kernel reinitializes the LCD and the LCD just begins to read waiting information data in the second video memory according to the address of the second video memory in the LCD controller, as the waiting information data in the second video memory needs to be rewritten, unnatural switching phenomena such as distortion, flashing, and blurred screen in the LCD screen display may occur. Generally, to prevent the conditions from being seen by users, a mode of turning off the LCD backlight is adopted; and due to discontinuous pictures, poor experience is generally brought to the users.

SUMMARY OF THE INVENTION

The embodiments of the invention provide a method and a mobile terminal for controlling display of waiting information during program startup for improving display quality during program startup.

A method for controlling display of waiting information during program startup includes:

initializing, by a bootloader, a Liquid Crystal Display (LCD) according to a received kernel program startup instruction, distributing a first video memory, initializing a first address of the first video memory to an LCD controller and starting a kernel program after the pre-startup is completed;

distributing a second video memory after the startup of the kernel program, copying waiting information data in the first video memory to the second video memory and reinitializing a first address of the second video memory to the LCD controller; and acquiring the first address of the video memory from the LCD controller at a set frequency after the LCD is initialized by the bootloader, reading and displaying the waiting information data in the first video memory when the first address of the first video memory is acquired, and reading and displaying the waiting information data in the second video memory when the first address of the second video memory is acquired.

Further, initializing the LCD by the bootloader includes:

initializing, by the bootloader, the LCD according to a display quality required by the program to be started.

Preferably, copying the waiting information data in the first video memory to the second video memory by the kernel program includes:

determining an initial address of the first video memory;
determining an initial address for storing the waiting information data in the first video memory, and acquiring the waiting information data; and
copying the waiting information data in the first video memory to the second video memory.

Further, the initial address of the first video memory, determined by the kernel program, is: an initial address of a memory in which the first video memory is located plus a size of the whole memory and subtract 2 M space.

Further, the initial address for storing the waiting information data in the first video memory, determined by the kernel program, is: the sum of the initial address of the first video memory and 20 bytes.

Preferably, the method further includes: after the LCD controller is initialized according to the address of the second video memory, modifying the waiting information data copied to the second video memory from the first video memory in the second video memory.

A corresponding mobile terminal includes a memory configured to distribute a video memory, an LCD configured to read waiting information data in the video memory according to a first address of the video memory in an LCD controller after being initialized and to display, a CPU configured to connect the LCD with the memory, and the LCD controller arranged in the CPU, wherein the CPU further includes:

a pre-startup unit configured to initialize the LCD after receiving a kernel program startup instruction, distribute a first video memory for storing waiting information data to be displayed in the memory, store the waiting information data to be displayed in the first video memory, initialize a first address of the first video memory to the LCD controller and trigger to start a kernel program after the pre-startup is completed; and a kernel unit configured to start the kernel program, distribute the second video memory for storing the waiting information data in the memory, copy the waiting information data in the first video memory to the second video memory, and reinitialize a first address of the second video memory to the LCD controller.

Further, the pre-startup unit initializes the LCD according to a display quality required by the program to be started.

Preferably, the kernel unit copies the waiting information data in the first video memory to the second video memory, including:

distributing the second video memory and determining an initial address of the first video memory;

determining an initial address for storing the waiting information data in the first video memory, and acquiring the waiting information data; and copying the waiting information data in the first video memory to the second video memory.

Further, the kernel unit is further configured to modify the waiting information data copied to the second video memory from the first video memory in the second video memory.

According to the method and the mobile terminal for controlling the display of the waiting information during program startup provided by the embodiments of the invention, a step of initializing the LCD by the kernel is eliminated; after the waiting information data in the video memory of the bootloader is copied to the video memory of the kernel, the LCD controller is initialized, the LCD can directly read the waiting information data in the video memory of the kernel according to the first address of the video memory in the LCD controller, and the waiting information data in the video memory of the bootloader has already been previously copied to the video memory of the kernel, so the displayed contents are not changed for the users; furthermore, as the step of initializing the LCD is eliminated, the phenomena of distortion, flashing, blurred screen and the like of the LCD screen display are completely avoided, the display quality during program startup is improved, and better visual experience is brought to the users.

DETAILED DESCRIPTION OF THE EMBODIMENT

The embodiments of the invention provide a method and a mobile terminal for controlling display of waiting information during program startup. Sometimes, the LCD display quality set during bootloader startup cannot meet with the strong functions supported by the software, so when the kernel is started, the LCD is generally reset according to the display quality required by the software. In fact, the LCD display quality set during the bootloader startup can already meet with the display requirements of most software, so that the initialization of the LCD during kernel startup can be completely omitted, thus the phenomena of screen flashing, distortion, blurred screen and the like caused in the initialization of the LCD can be avoided.

Furthermore, before the kernel initializes the LCD controller, waiting information data in the first video memory has been copied to the second video memory, and after the LCD controller is initialized, when the LCD reads the waiting information data in the second video memory according to the address of the second video memory in the LCD controller, the second video memory has already had the waiting information data, and the waiting information data are the same as those read in the first video memory, so the users feel that the pictures are continuous, and seamless connection of picture display after kernel startup is realized.

Figure 2:
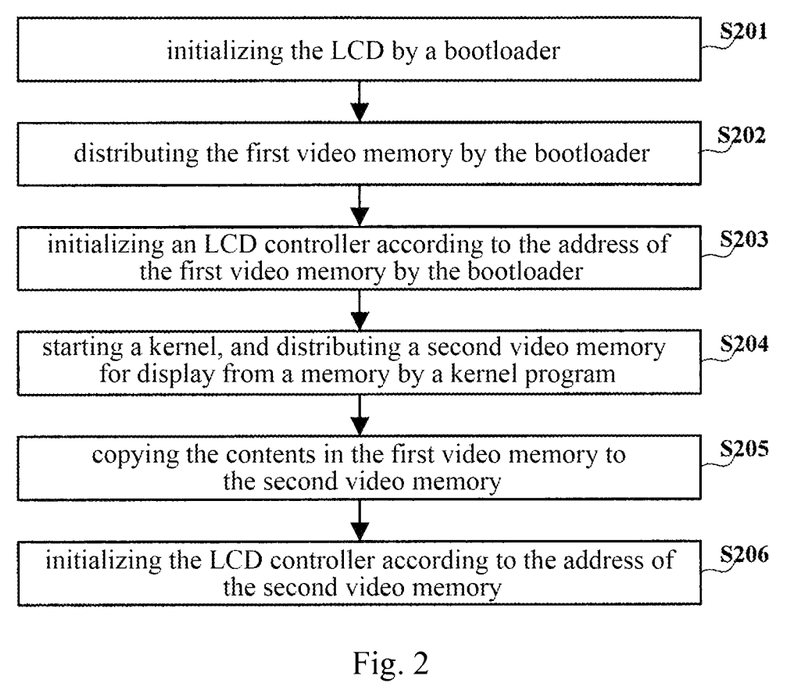
FIG. 2 is a flow chart of a program startup method according to an embodiment of the invention.

As shown in FIG. 2, the method for controlling the display of the waiting information during program startup, provided by an embodiment of the invention, includes the following steps:

S201, initializing an LCD by a bootloader;

S202, distributing a first video memory for display from a memory by the bootloader;

S203, initializing an LCD controller according to an address of the first video memory and initializing a first address of the first video memory to the LCD controller by the bootloader, and displaying according to waiting information data in the first video memory by the LCD;

triggering startup of a kernel program by the bootloader.

S204, starting the kernel program, and distributing a second video memory for display from the memory by the kernel program;

S205, copying the waiting information data in the first video memory to the second video memory;

S206, initializing the LCD controller according to an address of the second video memory, updating a first address of the second video memory to the LCD controller, and continuously displaying according to the waiting information data in the second video memory by the LCD.

Where the LCD controller is arranged in a CPU; S201, S202 and S203 are controlled and executed by the bootloader program executed in the CPU; and S204, S205 and S206 are controlled and executed by the kernel program executed in the CPU.

According to the setting during the initialization of the LCD, the LCD reads the video memory for multiple times every second and updates the displayed contents according to the waiting information data in the video memory, and the position of the video memory is found according to the first address of the video memory stored in the LCD controller when the LCD reads the video memory, so the LCD reads the waiting information data in the second video memory after the kernel initializes the LCD controller according to the address of the second video memory.

Therefore, after the LCD is initialized and the LCD controller is initialized according to the address of the distributed first video memory, the LCD reads the waiting information data in the first video memory according to the first address of the first video memory in the LCD controller and displays; and after the LCD controller is initialized according to the address of the distributed second video memory, the LCD reads the waiting information data in the second video memory according to the first address of the video memory in the LCD controller.

Thus, the displayed static pictures can be kept all the time from the bootloader to the completion of kernel startup, and the LCD backlight does not need to be turned off, so comparatively smooth feeling is brought to the users.

When the LCD reads the waiting information data in the video memory, the data can still be read through a DMA channel established by the CPU, so that the LCD directly accesses the video memory and reads the data without depending on the CPU.

Preferably, to further improve the feeling of the users and improve the display quality, when the bootloader initializes the LCD, the LCD can be initialized according to the display quality required by the program to be started, so even if the kernel does not initialize the LCD, the display quality can still meet with the requirement.

After the kernel is started, the LCD is not initialized any more, while the second video memory is directly distributed from the memory; however, when the linux kernel is started, the kernel program takes over all the hardware; and to conveniently control the LCD, the kernel program generally needs to initialize the LCD. When the initialization needs to be avoided, the following method can be adopted: as a power supply supplies power all the time, the contents in the LCD controller are set by the bootloader; and if the LCD is not initialized, the contents displayed by the LCD according to the LCD controller and the first video memory are the same as those of the static pictures during bootloader control.

The specific setting can be as follows: a specific framebuffer setting file, namely/driver/vidio/pxafb.c is attached in a linux kernel source code, where the file has a function pxafb-enable-controller for setting the LCD; firstly, a macro CONFIG_OBM_LOGO_DISPLAY is set, so that the kernel does not initialize the LCD; and in the pxafb_enable_controller, the function is returned after the macro CONFIG_OBM_LOGO_DISPLAY is executed.

When the first video memory is distributed, any section of continuous and idle space in the memory can be selected, so that before the waiting information data in the first video memory is copied to the second video memory, the kernel program can determine the first address of the first video memory according to a specific identifier of the first video memory or according to the first address of the first video memory in the LCD controller. The bootloader and the kernel have respective address spaces and share a complete DDR dynamic memory, and the space used by the bootloader is obviously smaller than that used by the kernel, so in order to meet the requirements of both, the first video memory distributed to the bootloader is preferably fixedly arranged at the less used rear end of the DDR dynamic memory. For example, if the video memory space required by the LCD is 600K, the initial address of the video memory can be set to be the last 2 M of the whole DDR dynamic memory. If the initial address of the DDR dynamic memory in the bootloader address space is 0x80000000, the first address of the first video memory OBM_LOGO_ADDRESS can be 0x80000000+size of the whole DDR dynamic memory−2 M space.

Figure 3:
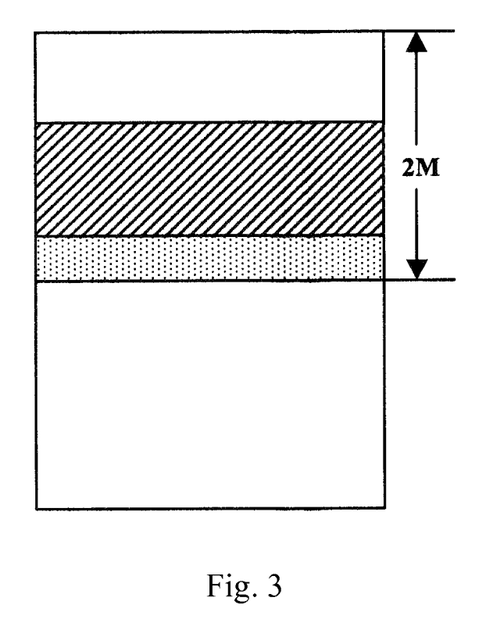
FIG. 3 is a schematic diagram of storing waiting information data in a first video memory according to an embodiment of the invention.

Thus, when the waiting information data in the first video memory is copied to the second video memory, the waiting information data in the first video memory can be acquired in the following mode: the data structure used for the video memory is generally FrameT in the bootloader, and a part of the video memory really used for storing the waiting information data does not start from the first address of the first video memory but is contained in the FrameT structure in the distributed first video memory, so if the waiting information data in the first video memory is copied to the second video memory, a first address of the part of the video memory in the first video memory shall be acquired, and generally, an offset value specified by the FrameT structure is added on the basis of the first address of the first video memory OBM_LOGO_ADDRESS; in the FrameT structure, other data of 20 bytes are contained before the part for storing the waiting information data in the video memory, so the address of the part for storing the waiting information data in the first video memory is acquired by adding the first address of the first video memory with 20 bytes, i.e., OBM_LOGO_ADDRESS+20; as shown in FIG. 3, the block in FIG. 3 is a schematic diagram of a memory, the lower end is the initial address of the memory, the upper end is the terminal address of the memory, the oblique line part is the part for storing the waiting information data in the first video memory, and the dotted part is the part for storing other data of 20 bytes before the waiting information data in the FrameT structure; and after the address of the part for storing the waiting information data in the first video memory is acquired, the stored waiting information data can be acquired by using an ioremap-nocache function or other similar functions, and then the acquired waiting information data can be copied to the second video memory.

After the LCD displays according to the waiting information data stored in the second video memory, the waiting information data in the second video memory can be directly modified, so that smooth dynamic animation effect can be achieved on the basis of the original static pictures, and better visual experience can be brought to the users.

Figure 4:
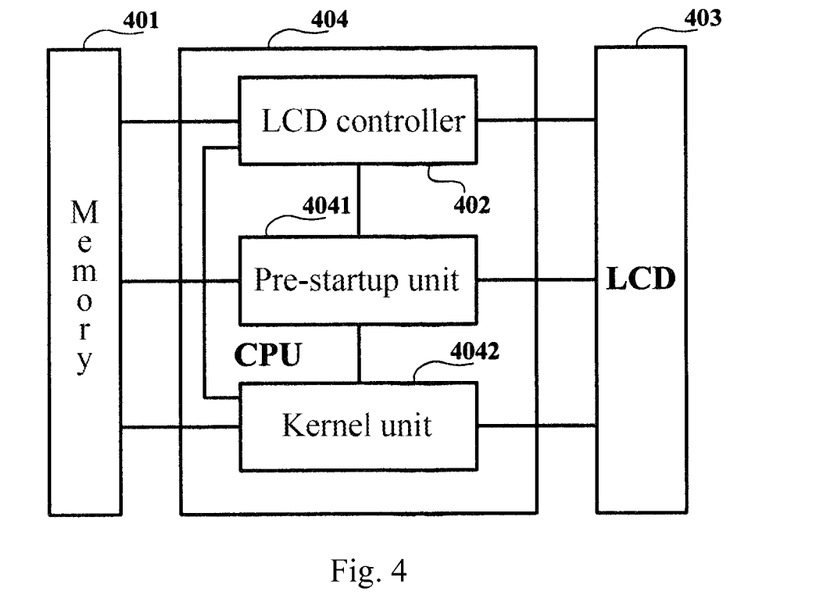
FIG. 4 is a structural schematic diagram of a program startup device according to an embodiment of the invention.

An embodiment of the invention also correspondingly provides a mobile terminal, as shown in FIG. 4, including: a memory 401 configured to distribute a video memory, an LCD controller 402, an LCD 403 configured to read waiting information data in the video memory according to a first address of the video memory in the LCD controller after being initialized and to display, and a CPU 404 configured to connect the LCD 403 with the memory 401, where the LCD controller 402 can be arranged in the CPU 404, and the CPU 404 further includes:

a pre-startup unit 4041 configured to initialize the LCD after receiving a program startup instruction, distribute a first video memory for storing the waiting information data to be displayed in the memory 401, initialize a first address of the first video memory to the LCD controller 402 and trigger startup of a kernel program after the pre-startup is completed; and a kernel unit 4042 configured to start the kernel program, distribute a second video memory for storing the waiting information data in the memory 401, copy the waiting information data in the first video memory to the second video memory, initialize the LCD controller 402, and update a first address of the second video memory to the LCD controller 402.

The mobile terminal can be a mobile phone, and can also be other portable equipments capable of running programs.

Before the kernel initializes the LCD controller, the waiting information data in the first video memory has been copied to the second video memory, and after the LCD controller is initialized, when the LCD reads the waiting information data in the second video memory according to the address of the second video memory in the LCD controller, the second video memory has already had the waiting information data, and the waiting information data are the same as those read in the first video memory, so the users feel that the pictures are continuous, and seamless connection of picture display after kernel startup is realized.

To further improve the feeling of the users, when the pre-startup unit 4041 initializes the LCD 403 according to the display quality required by the program to be started.

The kernel unit 4042 copies the waiting information data in the first video memory to the second video memory, includes:
  distributing the second video memory and determining an initial address of the first video memory;
  determining an initial address for storing the waiting information data in the first video memory, and acquiring the waiting information data; and
  copying the waiting information data in the first video memory to the second video memory.

After the LCD displays according to the waiting information data stored in the second video memory, the waiting information data in the second video memory can be directly modified, so that smooth animation effect can be achieved based on the original static pictures, and better visual experience can be brought to the users. And the kernel unit 4042 is further configured to modify the waiting information data copied to the second video memory from the first video memory in the second video memory.

According to the method and the device for controlling the display of the waiting information during program startup provided by the embodiments of the invention, the step of initializing the LCD by the kernel is eliminated; after the waiting information data in the video memory of the bootloader is copied to the video memory of the kernel, the LCD controller is initialized, therefore, the LCD can directly read the waiting information data in the video memory of the kernel according to the first address of the video memory in the LCD controller, and the waiting information data in the video memory of the bootloader has already been previously copied to the video memory of the kernel, so the displayed contents are not changed for the users; furthermore, as the step of initializing the LCD is eliminated, the phenomena of distortion, flashing, blurred screen and the like of the LCD screen display are completely avoided, the display quality during program startup is improved, and good visual feeling is brought to the users.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method of controlling display of waiting information during program startup comprising:
   initializing, by a bootloader, a Liquid Crystal Display, LCD, distributing a first video memory, copying or writing a waiting information into the first video memory, copying a first address of the first video memory to an LCD controller, displaying, by the LCD, according to waiting information data in the first video memory and triggering startup of a kernel program; and
   during the startup of the kernel program, distributing a second video memory, copying the waiting information data in the first video memory to the second video memory, updating a first address of the second video memory to the LCD controller, and continuously displaying, by the LCD, according to the waiting information data in the second video memory, to enable content displayed on the LCD during the startup of the kernel program to be the same as content displayed on the LCD before the startup of the kernel program, wherein the waiting information data in the second video memory is the same as the waiting information data in the first video memory.

2. The method of claim 1, wherein initializing the LCD by the bootloader comprises:
   initializing, by the bootloader, the LCD according to a display quality required by the program to be started.

3. The method of claim 1, wherein copying the waiting information data in the first video memory to the second video memory by the kernel program comprises:
   determining an initial address of the first video memory;
   determining an initial address for storing the waiting information data in the first video memory, and acquiring the waiting information data; and
   copying the waiting information data in the first video memory to the second video memory.

4. The method of claim 3, wherein the initial address of the first video memory, determined by the kernel program, is: an initial address of a memory in which the first video memory is located plus a size of the whole memory and subtract 2 MB space.

5. The method of claim 4, wherein the initial address for storing the waiting information data in the first video memory, determined by the kernel program, is: the sum of the initial address of the first video memory and 20 bytes.

6. The method of claim 3, wherein the initial address for storing the waiting information data in the first video memory, determined by the kernel program, is: the sum of the initial address of the first video memory and 20 bytes.

7. The method of claim 1, wherein after reinitializing the first address of the second video memory to the LCD controller, further comprising:
   modifying the waiting information data copied to the second video memory from the first video memory in the second video memory.

8. The method of claim 1, wherein continuously displaying, by the LCD, according to the waiting information data in the second video memory comprises:
   continuously displaying, by the LCD, according to the waiting information data in the second video memory until the startup of the kernel program is completed.

9. The method of claim 1, wherein distributing the first video memory comprises:
   selecting any section of continuous and idle space in a memory as the first video memory.

10. A mobile terminal, comprising a memory and a processor, wherein the memory stores program code, and wherein the program code is executable by the processor to implement:
   initializing, by a bootloader, a Liquid Crystal Display, LCD, distributing a first video memory, copying or writing a waiting information into the first video memory, copying a first address of the first video memory to an LCD controller, displaying, by the LCD, according to waiting information data in the first video memory and triggering startup of a kernel program; and
   during the startup of the kernel program, distributing a second video memory, copying waiting information data in the first video memory to the second video memory, updating a first address of the second video memory to the LCD controller, and continuously displaying, by the LCD, according to the waiting information data in the second video memory, to enable content displayed on the LCD during the startup of the kernel program to be the same as content displayed on the LCD before the startup of the kernel program, wherein the waiting information data in the second video memory is the same as the waiting information data in the first video memory.

11. The mobile terminal of claim 10, wherein initializing the LCD by the bootloader comprises:
   initializing, by the bootloader, the LCD according to a display quality required by the program to be started.

12. The mobile terminal of claim 10, wherein copying the waiting information data in the first video memory to the second video memory by the kernel program comprises:
   determining an initial address of the first video memory;
   determining an initial address for storing the waiting information data in the first video memory, and acquiring the waiting information data; and
   copying the waiting information data in the first video memory to the second video memory.

13. The mobile terminal of claim 12, wherein the initial address of the first video memory, determined by the kernel program, is: an initial address of a memory in which the first video memory is located plus a size of the whole memory and subtract 2 MB space.

14. The mobile terminal of claim 12, wherein the initial address for storing the waiting information data in the first video memory, determined by the kernel program, is the sum of the initial address of the first video memory and 20 bytes.

15. The mobile terminal of claim 10, wherein after reinitializing the first address of the second video memory to the LCD controller, further comprising:
   modifying the waiting information data copied to the second video memory from the first video memory in the second video memory.

16. The mobile terminal of claim 10, wherein continuously displaying, by the LCD, according to the waiting information data in the second video memory comprises: continuously displaying, by the LCD, according to the waiting information data in the second video memory until the startup of the kernel program is completed.

17. The mobile terminal of claim 10, wherein distributing the first video memory comprises:
   selecting any section of continuous and idle space in a memory as the first video memory.

\* \* \* \* \*